US012581292B2

(12) United States Patent
Lin et al.

(10) Patent No.: US 12,581,292 B2
(45) Date of Patent: Mar. 17, 2026

(54) METHOD AND SYSTEM FOR SECURE DATA TRANSMISSION

(71) Applicant: LITE-ON TECHNOLOGY CORPORATION, Taipei City (TW)

(72) Inventors: Pei-Hsuan Lin, Taipei City (TW); Wei-Chuang Huang, Taipei City (TW)

(73) Assignee: LITE-ON TECHNOLOGY CORPORATION, Taipei City (TW)

( * ) Notice: Subject to any disclaimer, the term of this patent is extended or adjusted under 35 U.S.C. 154(b) by 363 days.

(21) Appl. No.: 18/535,334

(22) Filed: Dec. 11, 2023

(65) Prior Publication Data

US 2025/0080978 A1 Mar. 6, 2025

(30) Foreign Application Priority Data

Sep. 4, 2023 (TW) ................................. 112133464

(51) Int. Cl.
| | |
|---|---|
| *H04W 60/04* | (2009.01) |
| *H04W 12/03* | (2021.01) |
| *H04W 12/0431* | (2021.01) |
| *H04W 12/06* | (2021.01) |

(52) U.S. Cl.
CPC ....... *H04W 12/0431* (2021.01); *H04W 12/03* (2021.01); *H04W 12/068* (2021.01); *H04W 60/04* (2013.01)

(58) Field of Classification Search
None
See application file for complete search history.

(56) References Cited

U.S. PATENT DOCUMENTS

| | | |
|---|---|---|
| 12,021,941 B2 | 6/2024 | Tsai |
| 2022/0014963 A1* | 1/2022 | Yeh ................... H04W 28/0268 |

FOREIGN PATENT DOCUMENTS

| | | |
|---|---|---|
| CN | 114630265 A | 6/2022 |
| TW | I784773 B | 11/2022 |
| WO | 2022186912 A1 | 9/2022 |
| WO | 2023091664 A1 | 5/2023 |

OTHER PUBLICATIONS

Chinese language office action dated Aug. 12, 2024, issued in application No. TW 112133464.
O-RAN Security Focus Group (SFG); "O-RAN.SFG.Non-RT-RIC-Security-TR-v01.00;" O-RAN Security Focus Group (SFG) Study on Security for Non-RT-RIC; Jul. 2022; pp. 1-35.

* cited by examiner

*Primary Examiner* — Idowu O Osifade
(74) *Attorney, Agent, or Firm* — McClure, Qualey & Rodack, LLP

(57) ABSTRACT

A method for secure data transmission is provided. The method includes requesting a key from an encryption and decryption application in a near real-time radio access network (RAN) intelligent controller (Near-RT RIC). The method includes receiving the key from the encryption and decryption application. The method includes encrypting data by using the key, and generating encrypted data. The method includes storing the encrypted data to a database in the Near-RT RIC through a shared data layer.

21 Claims, 7 Drawing Sheets

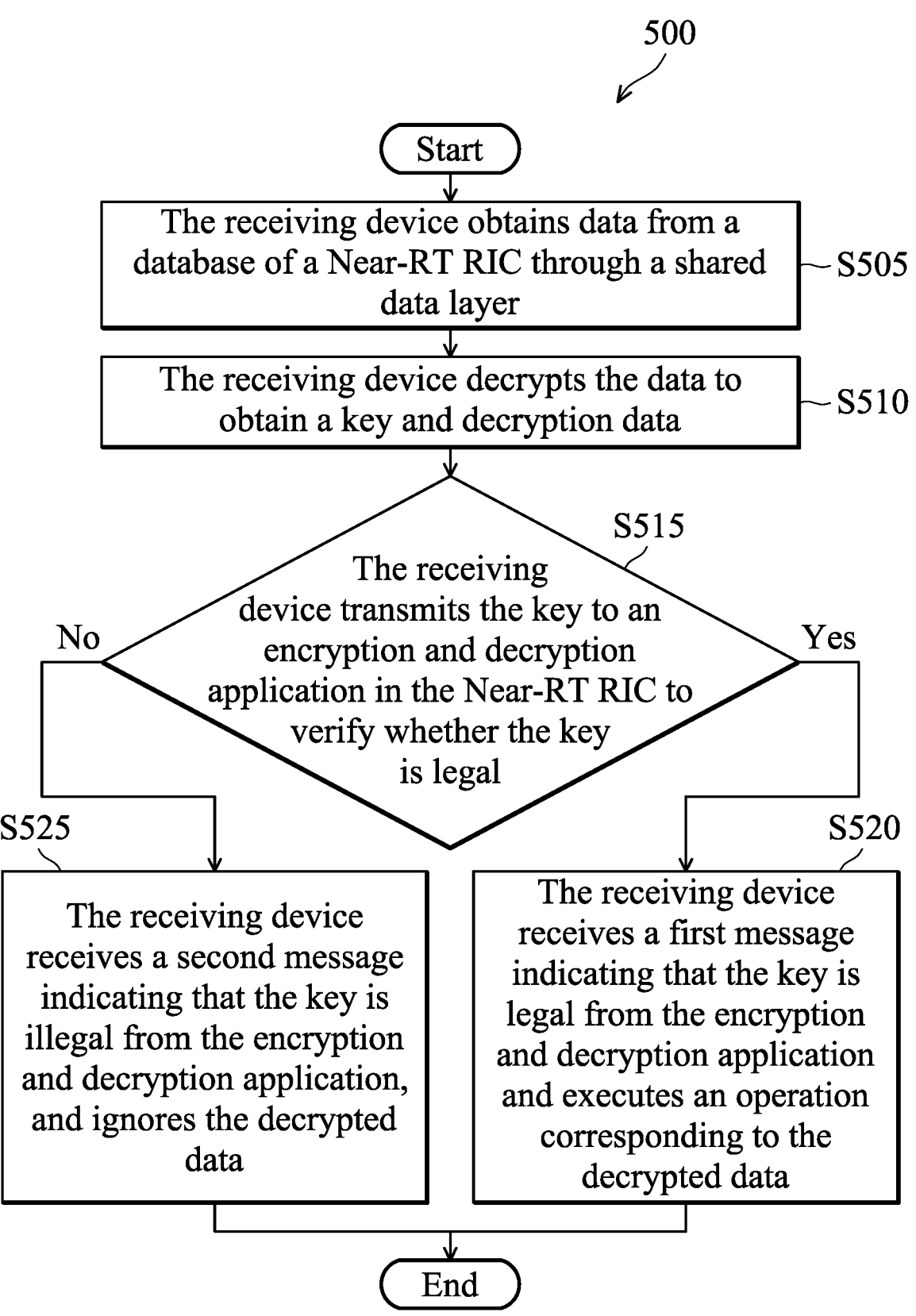

500

Start

The receiving device obtains data from a database of a Near-RT RIC through a shared data layer — S505

The receiving device decrypts the data to obtain a key and decryption data — S510

S515

The receiving device transmits the key to an encryption and decryption application in the Near-RT RIC to verify whether the key is legal No                                                    Yes

S525

The receiving device receives a second message indicating that the key is illegal from the encryption and decryption application, and ignores the decrypted data

S520

The receiving device receives a first message indicating that the key is legal from the encryption and decryption application and executes an operation corresponding to the decrypted data End

FIG. 5

METHOD AND SYSTEM FOR SECURE DATA TRANSMISSION

CROSS REFERENCE TO RELATED APPLICATIONS

This application claims priority from Taiwan Patent Application No. 112133464, filed on Sep. 4, 2023, the disclosure of which is incorporated herein in its entirety by reference.

BACKGROUND OF THE INVENTION

Field of the Invention

The present disclosure generally relates to Open Radio Access Network (O-RAN) technology. More specifically, aspects of the present disclosure relate to a method and system for secure data transmission between applications in a near real-time radio access network (RAN) intelligent controller (Near-RT RIC).

Description of the Related Art

"Softwarization of Everything" is a concept that has generally become accepted in recent years in the fields of networking, computing, and communication. In recent years, the theory of software-defined radio has been gradually implemented in mobile communication networks. Software-defined cellular networks based on key enabling technologies such as "Softwarization", "Virtualization" and disaggregation of networking functionalities have been regarded as key technologies that will support B5G/6G for fast network optimization in the future. In the past, the 4G network was designed in the form of a blackbox, which will not be able to bear highly flexible configuration conditions in the future. Many telecom operators are gradually turning their attention to the research and implementation of Open Radio Access Network (Open RAN). Open RAN has attracted much attention through the network integration and deployment of hardware and software of different telecommunication providers through an open user interface. The establishment of the O-RAN Alliance solves the problem wherein a single manufacturer's research and development requires a lot of human resources and money, and undoubtedly provides a great boost to the research and development of the Open RAN. The O-RAN Software Community (O-RAN SC) is responsible for developing the open source software modules required for O-RAN function definition, and manages all software development related to the wireless access network (including technical documentation, testing and integration of various open source software), code storage, tools and developer integration testing work, so that the software code is consistent with the open architecture and specifications of the O-RAN Alliance.

O-RAN is an Open RAN version standardized by the O-RAN Alliance. O-RAN is built on the basis of 3GPP, including new functions, open and interoperable interfaces. This new approach to RAN architecture may bring some benefits related to increased supply chain diversity and reduced deployment costs, while increasing network integration costs and complexity.

In the O-RAN architecture, a radio access network (RAN) intelligent controller (RIC) is defined. The RICs are further divided into a non-real time RAN intelligent controller (Non-RT RIC) and a near-real time RAN intelligent controller (Near-RT RIC).

However, the current software version released by the O-RAN SC does not discuss the security mechanism of data transmission between applications (xApp) in the Near-RT RIC.

Therefore, a method and system for secure data transmission between applications in the Near-RT RIC are needed to make data transmission between applications more secure.

BRIEF SUMMARY OF THE INVENTION

The following summary is illustrative only and is not intended to be limiting in any way. That is, the following summary is provided to introduce concepts, highlights, benefits and advantages of the novel and non-obvious techniques described herein. Select, not all, implementations are described further in the detailed description below. Thus, the following summary is not intended to identify essential features of the claimed subject matter, nor is it intended for use in determining the scope of the claimed subject matter.

In an exemplary embodiment, a method for secure data transmission is provided. The method is used in a transmitting device and comprises requesting a key from an encryption and decryption application in a near real-time radio access network (RAN) intelligent controller (Near-RT RIC). The method comprises receiving the key from the encryption and decryption application. The method comprises encrypting data by using the key, and generating encrypted data. The method comprises storing the encrypted data to a database in the Near-RT RIC through a shared data layer.

In some embodiments, the transmitting device is an application (xApp) in the Near-RT RIC.

In some embodiments, the key is a one-time key and generated by a Time-based One-time Password (TOTP) algorithm.

In some embodiments, before requesting the key, the method further comprises transmitting a registration request message to the encryption and decryption application to request to register the transmitting device as a trusted device. The method further comprises receiving a registration reply message from the encryption and decryption application, wherein the registration reply message is used to notify that the transmitting device has been registered as the trusted device.

In some embodiments, the registration reply message further comprises a token representing an identity of the transmitting device to prove that the transmitting device is legal.

In an exemplary embodiment, a method for secure data transmission is provided. The method is used in a receiving device and comprises obtaining data from a database of a near real-time radio access network (RAN) intelligent controller (Near-RT RIC) through a shared data layer. The method comprises decrypting the data to obtain a key and decryption data. The method comprises transmitting the key to the encryption and decryption application in the Near-RT RIC to verify whether the key is legal. The method comprises receiving a first message indicating that the key is legal from the encryption and decryption application when the encryption and decryption application verifies that the key is legal, and performing an operation corresponding to the decryption data.

In some embodiments, the method further comprises receiving a second message indicating that the key is illegal from the encryption and decryption application when the encryption and decryption application verifies that the key is illegal, and ignoring the decryption data.

In some embodiments, before obtaining the data, the method further comprises detecting whether the data is stored in the database through the shared data layer, and obtaining the data from the database through the shared data layer when the data is stored in the database.

In some embodiments, before obtaining the data, the method further comprises transmitting a query request message to the encryption and decryption application, and receiving a query reply message from the encryption and decryption application, wherein the query reply message indicates that a provider providing the data is a transmitting device.

In some embodiments, the receiving device is an application (xApp) in the Near-RT RIC.

In some embodiments, the key is a one-time key and generated by a Time-based One-time Password (TOTP) algorithm.

In an exemplary embodiment, a system for secure data transmission is provided. The system comprises a near real-time radio access network (RAN) intelligent controller (Near-RT RIC). The near-RT RIC comprises a transmitting device, a receiving device, an encryption and decryption application, and a database. The transmitting device requests a key from the encryption and decryption application, receives the key from the encryption and decryption application, encrypts data by using the key and generates encrypted data, and stores the encrypted data to the database through a shared data layer.

BRIEF DESCRIPTION OF THE DRAWINGS

The accompanying drawings are included to provide a further understanding of the present disclosure, and are incorporated in and constitute a part of the present disclosure. The drawings illustrate implementations of the disclosure and, together with the description, serve to explain the principles of the disclosure. It should be appreciated that the drawings are not necessarily to scale as some components may be shown out of proportion to their size in actual implementation in order to clearly illustrate the concept of the present disclosure.

FIG. 5 is a flow chart showing a method for secure data transmission according to an embodiment of the present disclosure.

DETAILED DESCRIPTION OF THE INVENTION

The embodiments of the present disclosure provide a method and a system for secure data transmission between applications in the Near-RT RIC, so as to make data transmission between applications more secure.

Figure 1:
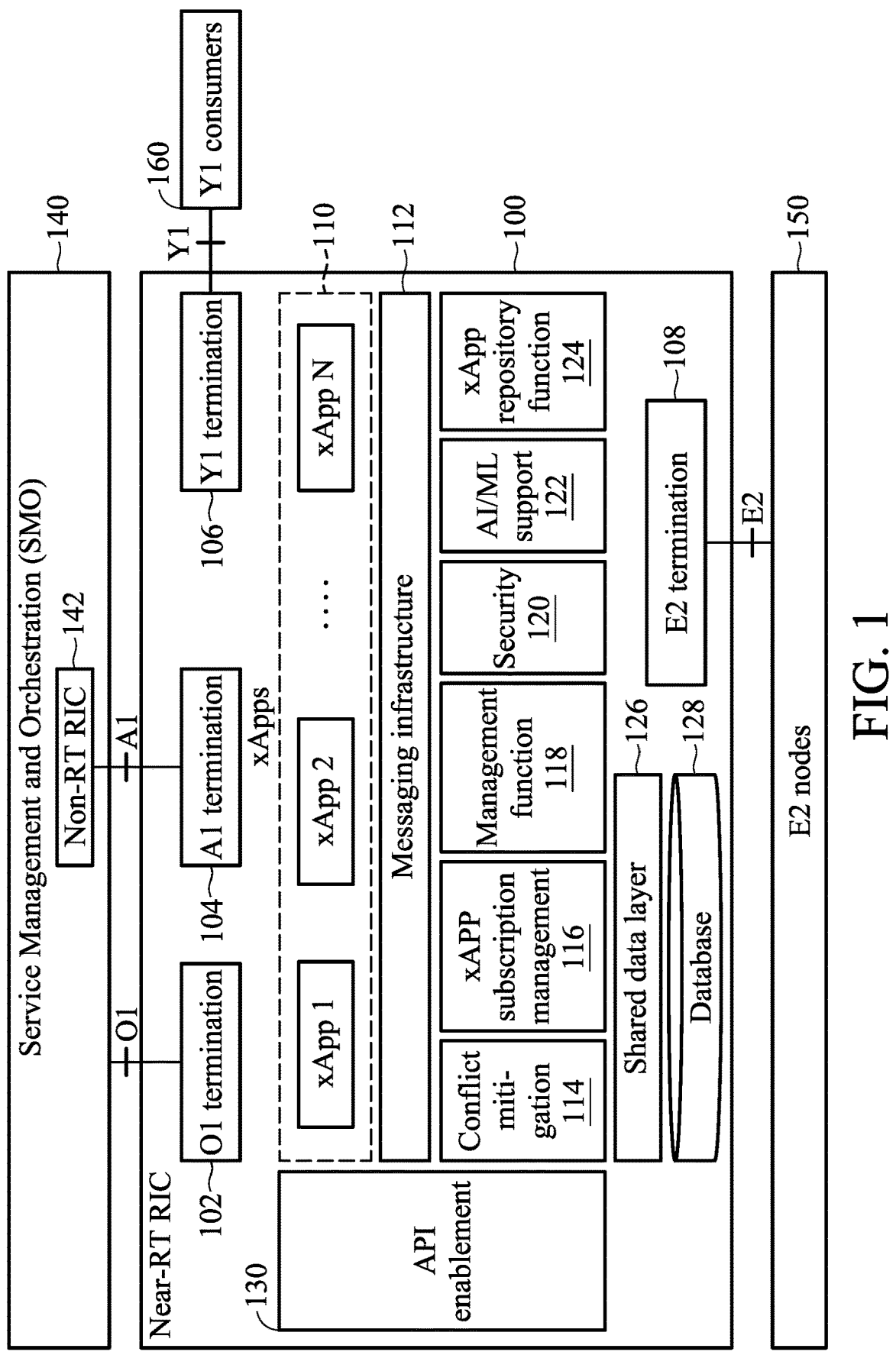
FIG. 1 is a diagram showing the internal architecture of the Near-RT RIC according to an embodiment of the present disclosure.

FIG. 1 is a diagram showing the internal architecture of the Near-RT RIC 100 according to an embodiment of the present disclosure. The Near-RT RIC 100 mainly comprises an O1 termination 102, an A1 termination 104, a Y1 termination 106, an E2 termination 108, applications (xApps) 110, a messaging infrastructure 112, a conflict mitigation 114, an xApp subscription management 116, a management function 118, a security 120, an Artificial Intelligence/Machine Learning (AI/ML) support 122, an xApp repository function 124, a shared data layer (SDL) 126, a database 128 and an Application programming interface (API) enablement 130.

The O1 termination 102 is used to connect an O1 interface from the Service Management and Orchestration (SMO) 140. The A1 termination 104 is used to connect an A1 interface from the Non-RT RIC 142 in the SMO 140. The Y1 termination 106 is used to connect a Y1 interface from the Y1 consumers 160. The E2 termination 108 is used to connect an E2 interface from the E2 nodes 150.

The xApps 110 includes multiple xApps (xApp 1, xApp 2, . . . , xApp N), wherein each xApp provides specific RAN functions for the corresponding E2 nodes. The xApps are considered as third-party applications and can be implemented by multiple micro services. The xApps 110 are used to enhance the RRM function of the O-RAN architecture. The xApps 110 can also provide basic information, such as information used to set configuration data, measurement, control and so on.

The messaging infrastructure 112 supports message interaction between the internal functions of the Near-RT RIC 100.

The conflict mitigation 114 resolves potentially overlapping or conflicting requests from multiple xApps 110.

The xApp subscription management 116 merges subscriptions from different xApps 110 and provides unified data distribution for xApps 110.

The management function 118 can serve as a service producer of the Service Management and Orchestration (SMO) 140 to perform fault management, configuration management and performance management. The management function 118 may further comprise logging, tracking, and metrics collection functions that capture, monitor, and collect internal status in the Near-RT RIC 100 and transmits the internal status to the external systems for further evaluation.

The security 120 provides security solutions for the xApps 110.

The AI/ML support 122 has functions such as data pipeline, training and performance monitoring of xApps 110.

The xApp repository function 124 may have a function of selecting an xApp for A1 message routing according to the A1 policy type and operator policy, and an access control function of the A1-EI type based on the operator policy xApp.

The database 128 and associated shared data layer 126 allow reading and writing radio access network (RAN)/user equipment (UE) information and other information required to support specific use cases. The xApps 110 may use the shared data layer 126 to subscribe to the notification service of the database 128 and to read, write, and modify information stored in the database 128.

The API enablement 130 supports functions related to API operations of the Near-RT RIC 100 (for example, API repository/registry, authentication, discovery, generic event subscription, etc.).

In one embodiment, an xApp in xApps 110 can also be an encryption and decryption application, for example, fingerprint image recognition and encryption and decryption functions, one-time password generation function, watermark encryption and decryption function or other encryption and decryption functions.

Before a first xApp in the xApps 110 stores data to the database 128, the first xApp may first request a key from the encryption and decryption application. When the first xApp receives the key from the encryption and decryption application, the first xApp uses the key to encrypt the data and generates encrypted data. The first xApp stores the encrypted data to the database 128 through the shared data layer 126.

When a second xApp in the xApps 110 obtains a second data from the database 128, the second xApp decrypts the second data to obtain a second key. Then, the second xApp sends the second key to the encryption and decryption application to verify whether the second key is legal. When the encryption and decryption application verifies that the second key is legal, the second xApp receives a first message indicating that the second key is legal from the encryption and decryption application, and performs an operation corresponding to the second data. When the encryption and decryption application verifies that the second key is illegal, the second xApp receives a second message indicating that the second key is illegal from the encryption and decryption application, and ignores or discards the second data.

It should be noted that the Near-RT RIC 100 may be implemented as a network element on dedicated hardware (such as a computing device, a server, or a processing circuitry of a processor in a computing device or server), or as a software instance running on dedicated hardware, or as a virtual function installed on an appropriate platform, e.g., a cloud infrastructure.

Figure 7:
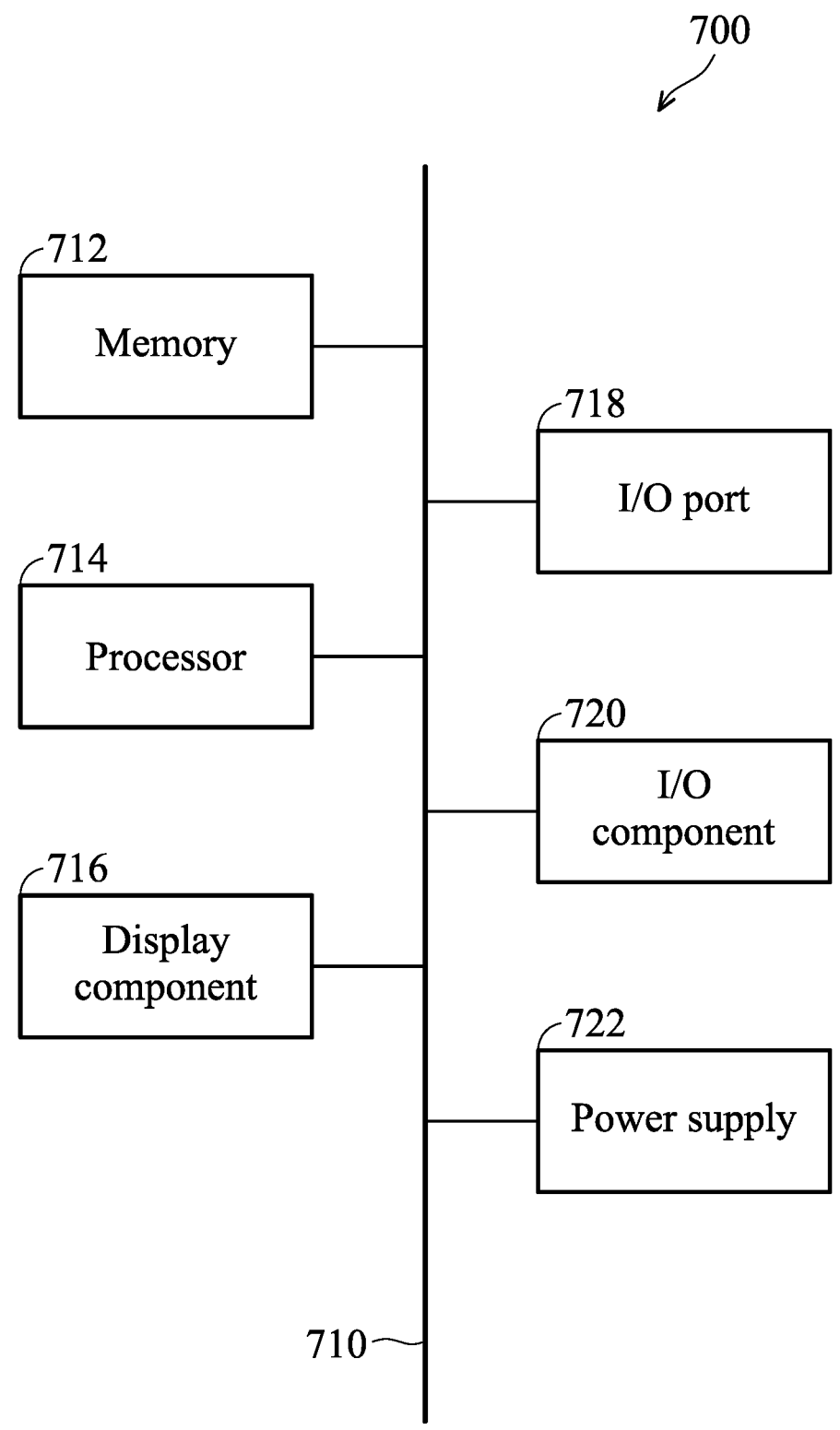
FIG. 7 illustrates an exemplary operating environment for implementing embodiments of the present disclosure.

It should be understood that when the Near-RT RIC 100 is used as dedicated hardware, the Near-RT RIC 100 may be implemented via any type of electronic device, such as the electronic device 700 described with reference to FIG. 7, as shown in FIG. 7.

Figure 2:
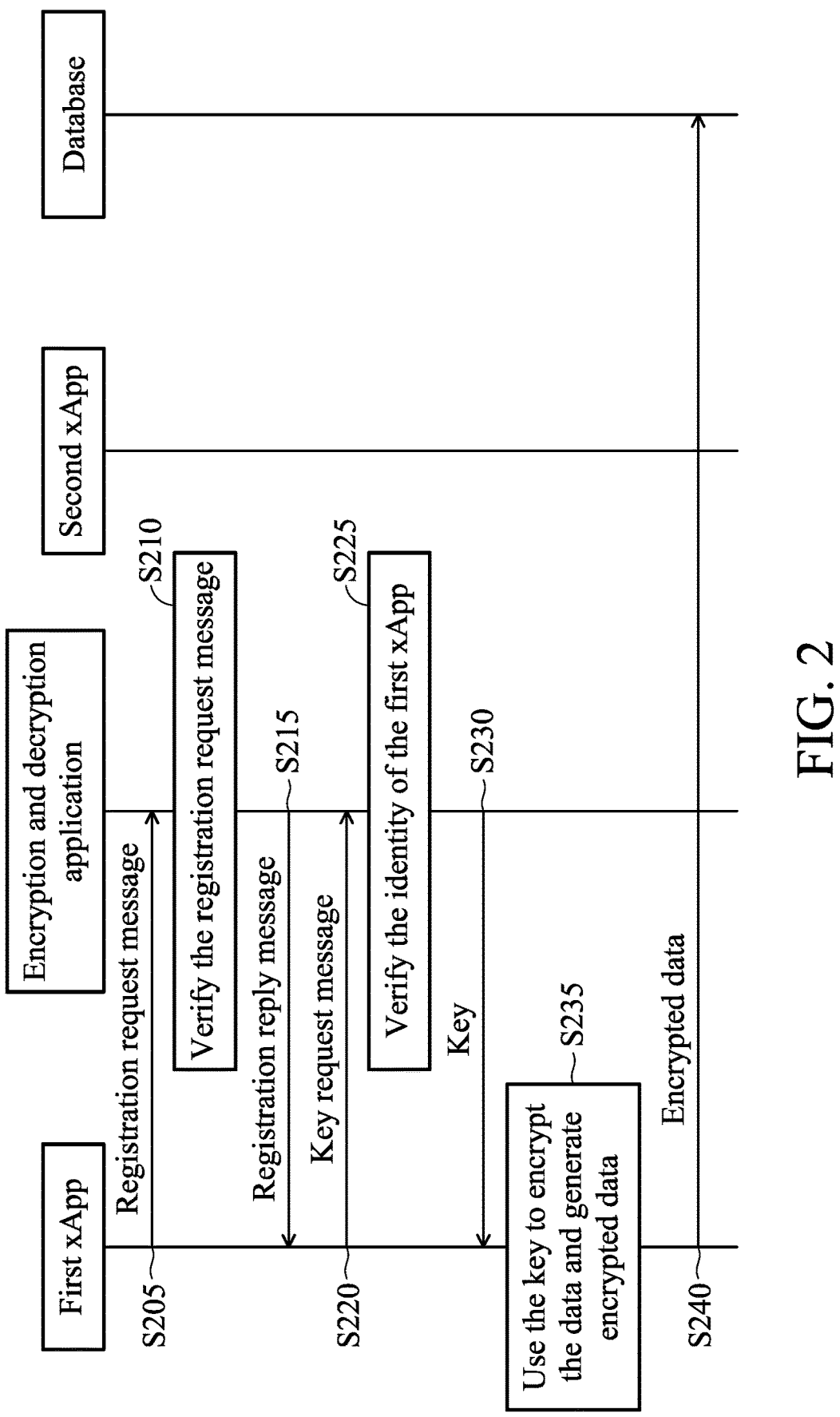
FIG. 2 is a message sequence diagram showing data encryption by the first xApp according to an embodiment of the present disclosure.

FIG. 2 is a message sequence diagram showing data encryption by the first xApp according to an embodiment of the present disclosure.

In step S205, the first xApp transmits a registration request message to the encryption and decryption application to request to register the first xApp as a trusted xApp, wherein the registration request message may comprise relevant information of the first xApp, e.g., an IP address, a name and other information.

In step S210, the encryption and decryption application verifies the registration request message.

When the encryption and decryption application verifies the registration request message, in step S215, the encryption and decryption application may transmit a registration reply message to the first xApp, wherein the registration reply message is used to notify the first xApp that the first xApp has been registered as the trusted xApp. In one embodiment, the registration reply message may further comprise a token that represents an identity of the first xApp, wherein the token represents that the first xApp must include the token in the request to prove that the first xApp is legal or has a legal identity when the first xApp wants to initiate a request to the encryption and decryption application.

In step S220, the first xApp transmits a key request message to the encryption and decryption application, wherein the key request message may comprise a token representing the identity of the first xApp, an IP address, a name and a deposited data type.

When the encryption and decryption application receives the key request message, in step S225, the encryption and decryption application verifies the identity of the first xApp according to the key request message.

When the encryption and decryption application verifies that the identity of the first xApp is legal, in step S230, the encryption and decryption application generates a key corresponding to the first xApp and transmits the key to the first xApp so that the first xApp can use the key to encrypt data.

In step S235, the first xApp uses the key to encrypt the data and generates encrypted data. In one embodiment, the data may be picture-type data or text-type data. The first xApp may encrypt the data using different encryption algorithms and the key according to the type of data.

In step S240, the first xApp stores the encrypted data to a database in the Near-RT RIC through a shared data layer.

It should be noted that the token generated by the encryption and decryption application in step S215 and the key generated in step S230 may be recorded in the encryption and decryption application respectively, for example, stored in a history record, for verification and comparison by the encryption and decryption application.

Figure 3:
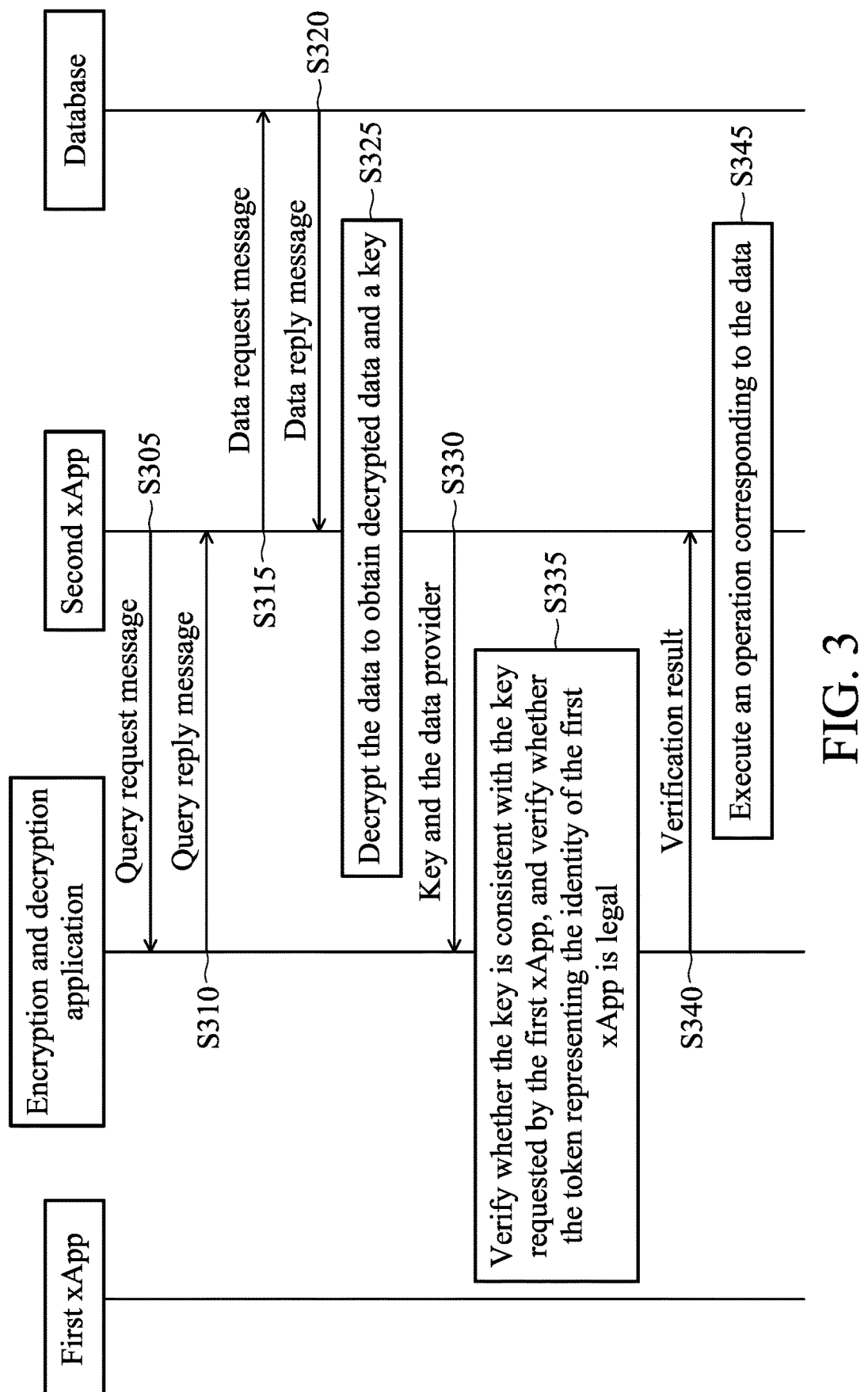
FIG. 3 is a message sequence diagram showing the second xApp obtaining data and decrypting the data according to an embodiment of the present disclosure.

FIG. 3 is a message sequence diagram showing the second xApp obtaining data and decrypting the data according to an embodiment of the present disclosure.

In step S305, the second xApp transmits a query request message to the encryption and decryption application to request to query the data provider corresponding to the data required by the second xApp.

In step S310, in response to receiving the query request message, the encryption and decryption application may transmit a query reply message to the second xApp, wherein the query reply message indicates that the data provider providing the data is the first xApp.

In step S315, the second xApp transmits a data request message to the database in the Near-RT RIC to request the data.

In step S320, in response to receiving the data request message, the database may transmit a data reply message to the second xApp, wherein the data reply message comprises the data, and the data is encrypted data.

In step S325, the second xApp decrypts the data to obtain decrypted data and a key.

In step S330, the second xApp transmits the key and the data provider "first xApp" obtained in step S310 to the encryption and decryption application to request to verify whether the key and the first xApp are legal.

In step S335, the encryption and decryption application verifies whether the key is consistent with the key requested by the first xApp in a historical record, and verifies whether the token representing the identity of the first xApp included in the key request message transmitted by the first xApp is legal based on the historical record. When the key is consistent with the key requested by the first xApp and the token representing the identity of the first xApp is legal, the encryption and decryption application verifies that the key is legal; otherwise, the encryption and decryption application verifies that the key is illegal. Specifically, when the encryption and decryption application confirms that the key is indeed requested by the first xApp based on the historical record and the token that is used by the first xApp when the first xApp requests the key and the token that is obtained when the first xApp registers as a trusted xApp are the same (that is, the key and the token are legal), the encryption and decryption application confirms that the decrypted data decrypted by the second xApp is real data.

In step S340, the encryption and decryption application transmits a verification result to the second xApp. In one embodiment, when the encryption and decryption application verifies that the key is legal, the verification result indicates that the key is legal. When the encryption and decryption application verifies that the key is illegal, the verification result indicates that the key is illegal.

When the second xApp receives the verification result, in step S345, the second xApp executes an operation corresponding to the data based on the verification result. In one embodiment, when the verification result indicates that the key is illegal, an operation corresponding to the data is to ignore the data or discard the data.

Figure 4:
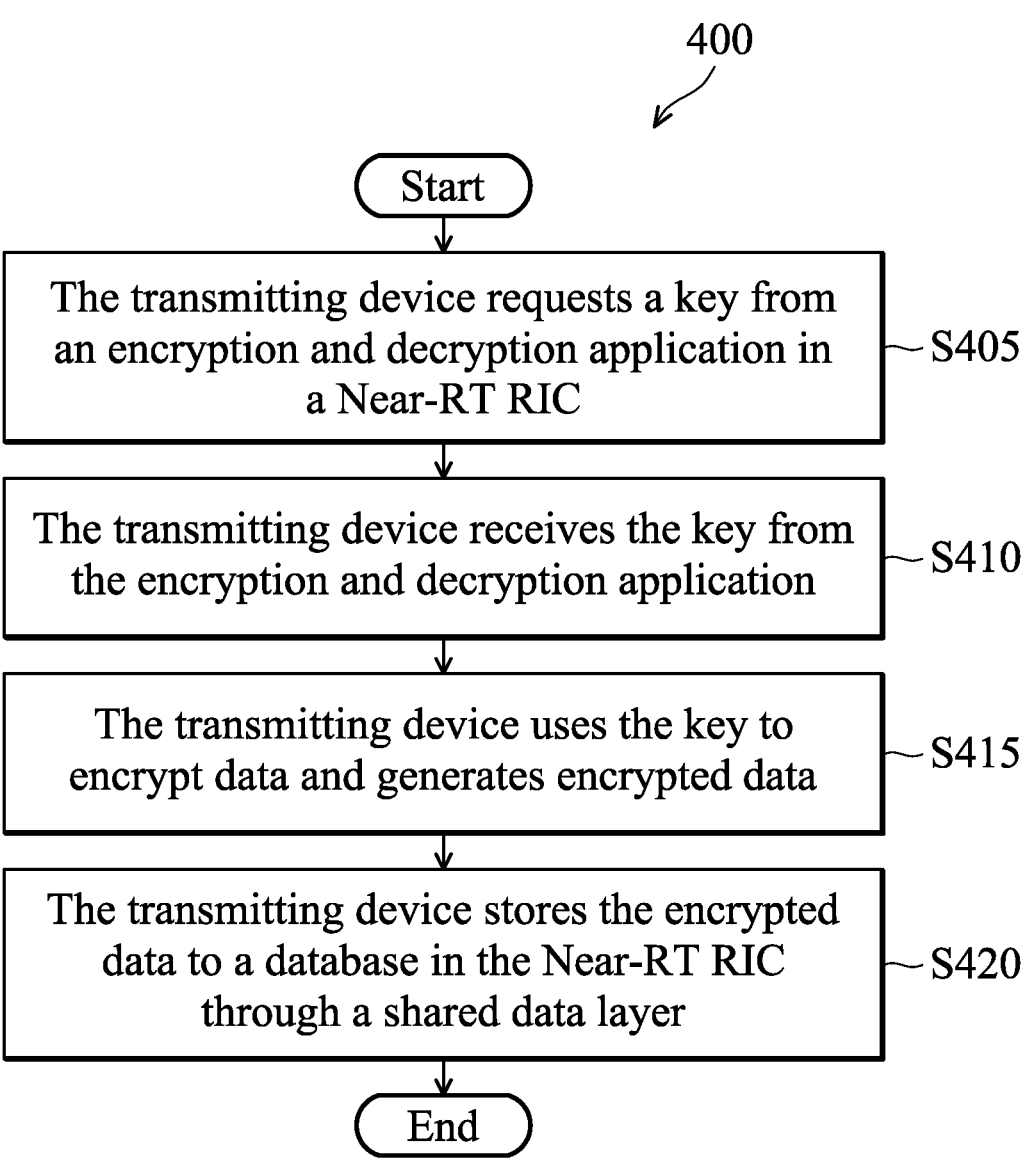
FIG. 4 is a flow chart showing a method for secure data transmission according to an embodiment of the present disclosure.

FIG. 4 is a flow chart 400 showing a method for secure data transmission according to an embodiment of the present disclosure. The method of FIG. 4 can be executed in a transmission device, wherein the transmission device can be one of the xApps 110 shown in FIG. 1.

In step S405, the transmitting device requests a key from an encryption and decryption application in a Near-RT RIC.

In step S410, the transmitting device receives the key from the encryption and decryption application. In one embodiment, the key is a one-time key and generated by a Time-based One-time Password (TOTP) algorithm.

In step S415, the transmitting device uses the key to encrypt data and generates encrypted data.

In step S420, the transmitting device stores the encrypted data to a database in the Near-RT RIC through a shared data layer.

FIG. 5 is a flow chart 500 showing a method for secure data transmission according to an embodiment of the present disclosure. The method in FIG. 5 can be executed in a receiving device, where the receiving device can be one of the xApps 110 shown in FIG. 1.

In step S505, the receiving device obtains data from a database of a Near-RT RIC through a shared data layer.

In step S510, the receiving device decrypts the data to obtain a key and decryption data. In one embodiment, the key is a one-time key and generated by a Time-based One-time Password (TOTP) algorithm.

In step S515, the receiving device transmits the key to an encryption and decryption application in the Near-RT RIC to verify whether the key is legal.

When the encryption and decryption application verifies that the key is legal ("Yes" in step S515), in step S520, the receiving device receives a first message indicating that the key is legal from the encryption and decryption application and executes an operation corresponding to the decrypted data.

When the encryption and decryption application verifies that the key is illegal ("No" in step S515), in step S525, the receiving device receives a second message indicating that the key is illegal from the encryption and decryption application, and ignores the decrypted data.

In one embodiment, before step S505, the receiving device can detect whether the data is stored in the database through the shared data layer. When the data is stored in the database, the receiving device obtains the data from the database through the shared data layer. In another embodiment, the receiving device can periodically detect whether storage records of the database are updated to determine whether data is stored in the database.

Figure 6:
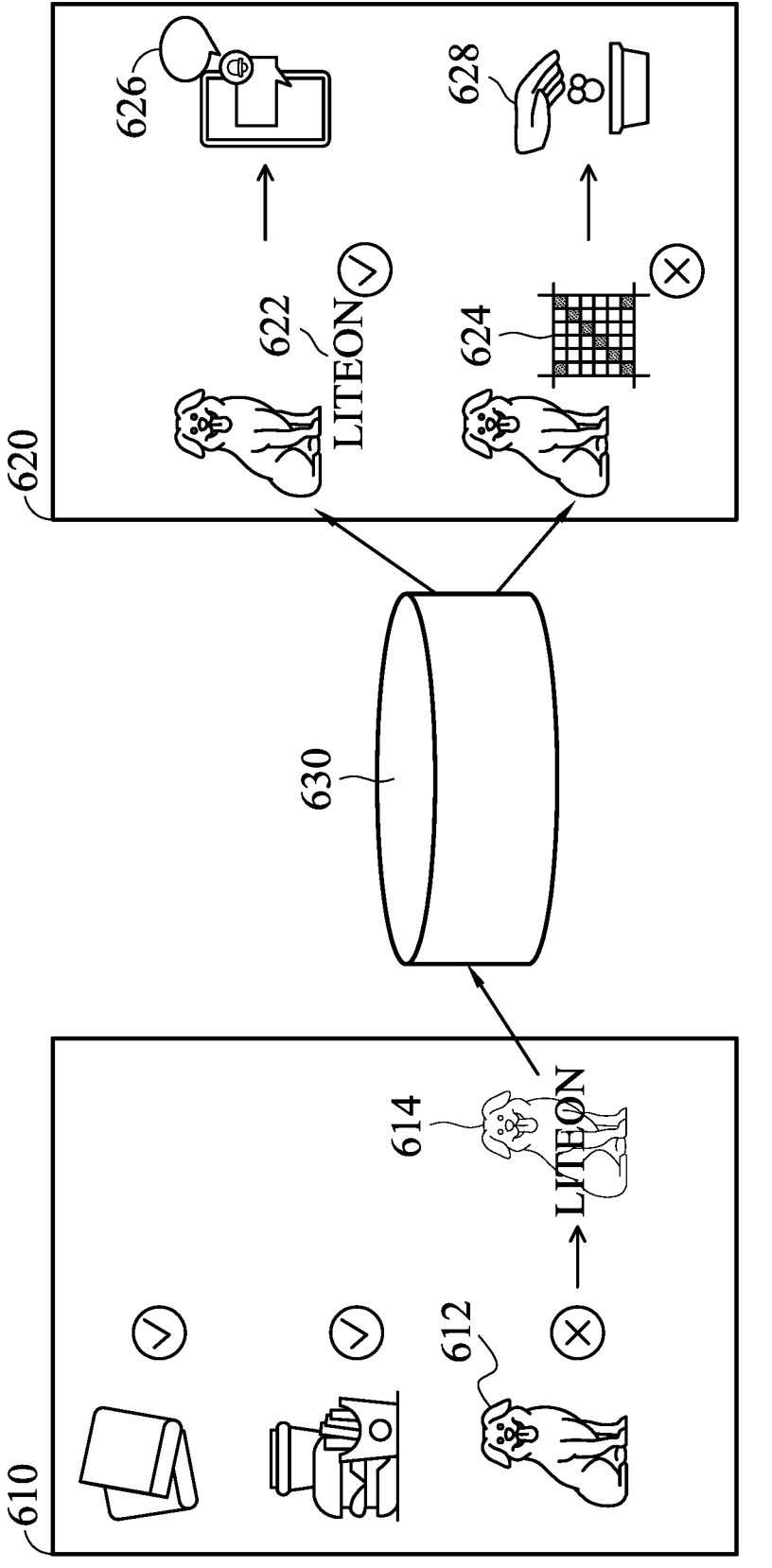
FIG. 6 is a schematic diagram showing the operation of secure data transmission according to an embodiment of the present disclosure.

FIG. 6 is a schematic diagram showing the operation of secure data transmission according to an embodiment of the present disclosure. It should be noted that the transmitting device and the receiving device in FIG. 6 respectively take the image recognition xApp 610 and the alarm xApp 620 as examples, and the encryption and decryption technology uses watermark encryption and decryption as an example. Those skilled in the art can make appropriate replacements or adjustments according to this embodiment.

As shown in FIG. 6, when the image recognition xApp 610 in the Near-RT RIC identifies an unencrypted image 612 in a stream, the image recognition xApp 610 performs a watermark encryption on the image 612 to generate an encrypted image 614, and stores the encrypted image 614 in the database 630 in the Near-RT RIC, wherein the watermark can be provided by an encryption and decryption application in the Near-RT RIC.

When the alarm xApp 620 in the Near-RT RIC obtains the encrypted image 614 in the database 630, the alarm xApp 620 may first decrypt the encrypted image 614 to obtain the image 612 and the watermark. The alarm xApp 620 may verify whether the watermark is legal with the encryption and decryption application.

When the encryption and decryption application verifies that the watermark is legal, the alarm xApp 620 receives a message 622 indicating that the watermark is legal from the encryption and decryption application, and performs an operation 626 (for example, setting an alarm clock, and displaying the image 612) corresponding to the image 612.

When the encryption and decryption application verifies that the watermark is illegal, the alarm xApp 620 receives a message 624 indicating that the watermark is illegal from the encryption and decryption application, and ignores or discards the picture 628.

As mentioned above, the method and system for secure data transmission between applications in the Near-RT RIC provided in the present disclosure encrypts the data to be transmitted between applications and stores the data in the database of the Near-RT RIC. When an application obtains data from the database, the application must further verify the legitimacy of the key through the encryption and decryption application to ensure the integrity of data transmission between applications.

Having described embodiments of the present disclosure, an exemplary operating environment in which embodiments of the present disclosure may be implemented is described below. Referring to FIG. 7, an exemplary operating environment for implementing embodiments of the present disclosure is shown and generally known as an electronic device 700. The electronic device 700 is merely an example of a suitable computing environment and is not intended to limit the scope of use or functionality of the disclosure. Neither should the electronic device 700 be interpreted as having any dependency or requirement relating to any one or combination of components illustrated.

The disclosure may be realized by means of the computer code or machine-useable instructions, including computer-executable instructions such as program modules, being executed by a computer or other machine, such as a personal data assistant (PDA) or other handheld device. Generally, program modules may include routines, programs, objects, components, data structures, etc., and refer to code that performs particular tasks or implements particular abstract data types. The disclosure may be implemented in a variety of system configurations, including hand-held devices, consumer electronics, general-purpose computers, more specialty computing devices, etc. The disclosure may also be implemented in distributed computing environments where tasks are performed by remote-processing devices that are linked by a communication network.

With reference to FIG. 7, the electronic device 700 may include a bus 710 that is directly or indirectly coupled to the following devices: one or more memories 712, one or more processors 714, one or more display components 716, one or more input/output (I/O) ports 718, one or more input/output components 720, and an illustrative power supply 722. The bus 710 may represent one or more kinds of busses (such as an address bus, data bus, or any combination thereof). Although the various blocks of FIG. 7 are shown with lines for the sake of clarity, in reality, the boundaries of the various components are not specific. For example, the display component such as a display device may be considered an I/O component and the processor may include a memory.

What is claimed is:

1. A method for secure data transmission, used in a transmitting device comprising:
   requesting a key from an encryption and decryption application in a near real-time radio access network (RAN) intelligent controller (Near-RT RIC);
   receiving the key from the encryption and decryption application;
   encrypting data by using the key, and generating encrypted data; and
   storing the encrypted data to a database in the Near-RT RIC through a shared data layer.

2. The method as claimed in claim 1, wherein the transmitting device is an application (xApp) in the Near-RT RIC.

3. The method as claimed in claim 1, wherein the key is a one-time key and generated by a Time-based One-time Password (TOTP) algorithm.

4. The method as claimed in claim 1, wherein before requesting the key, the method further comprises:
   transmitting a registration request message to the encryption and decryption application to request to register the transmitting device as a trusted device; and
   receiving a registration reply message from the encryption and decryption application, wherein the registration reply message is used to notify that the transmitting device has been registered as the trusted device.

5. The method as claimed in claim 4, wherein the registration reply message further comprises a token representing an identity of the transmitting device to prove that the transmitting device is legal.

6. A method for secure data transmission, used in a receiving device comprising:
   obtaining data from a database of a near real-time radio access network (RAN) intelligent controller (Near-RT RIC) through a shared data layer;
   decrypting the data to obtain a key and decryption data;
   transmitting the key to the encryption and decryption application in the Near-RT RIC to verify whether the key is legal; and
   receiving a first message indicating that the key is legal from the encryption and decryption application when the encryption and decryption application verifies that the key is legal, and performing an operation corresponding to the decryption data.

7. The method as claimed in claim 6, wherein the method further comprises:
   receiving a second message indicating that the key is illegal from the encryption and decryption application when the encryption and decryption application verifies that the key is illegal, and ignoring the decryption data.

8. The method as claimed in claim 6, wherein before obtaining the data, the method further comprises:

detecting whether the data is stored in the database through the shared data layer; and
obtaining the data from the database through the shared data layer when the data is stored in the database.

9. The method as claimed in claim 6, wherein before obtaining the data, the method further comprises:
   transmitting a query request message to the encryption and decryption application; and
   receiving a query reply message from the encryption and decryption application, wherein the query reply message indicates that a provider providing the data is a transmitting device.

10. The method as claimed in claim 6, wherein the receiving device is an application (xApp) in the Near-RT RIC.

11. The method as claimed in claim 6, wherein the key is a one-time key and generated by a Time-based One-time Password (TOTP) algorithm.

12. A system for secure data transmission, comprising:
   a near real-time radio access network (RAN) intelligent controller (Near-RT RIC), comprising:
   a transmitting device;
   a receiving device;
   an encryption and decryption application; and
   a database;
   wherein the transmitting device performs the following steps:
   requesting a key from the encryption and decryption application;
   receiving the key from the encryption and decryption application;
   encrypting data by using the key, and generating encrypted data; and
   storing the encrypted data to the database through a shared data layer.

13. The system as claimed in claim 12, wherein the transmitting device and the receiving device are applications (xApps) in the Near-RT RIC.

14. The system as claimed in claim 12, wherein the key is a one-time key and generated by a Time-based One-time Password (TOTP) algorithm.

15. The system as claimed in claim 12, wherein before requesting the key, the transmitting device further performs the following steps:
   transmitting a registration request message to the encryption and decryption application to request to register the transmitting device as a trusted device; and
   receiving a registration reply message from the encryption and decryption application, wherein the registration reply message is used to notify that the transmitting device has been registered as the trusted device.

16. The system as claimed in claim 15, wherein the registration reply message further comprises a token representing an identity of the transmitting device to prove that the transmitting device is legal.

17. The system as claimed in claim 12, wherein the receiving device performs the following steps:
   obtaining second data from the database through the shared data layer;
   decrypting the second data to obtain a second key and decryption data;
   transmitting the second key to the encryption and decryption application to verify whether the second key is legal; and
   receiving a first message indicating that the second key is legal from the encryption and decryption application when the encryption and decryption application verifies that the second key is legal, and performing an operation corresponding to the decryption data.

18. The system as claimed in claim 17, wherein the receiving device further performs the following steps:

receiving a second message indicating that the second key is illegal from the encryption and decryption application when the encryption and decryption application verifies that the second key is illegal, and ignoring the decryption data.

19. The system as claimed in claim 17, wherein before obtaining the data, the receiving device further performs the following steps:

detecting whether the second data is stored in the database through the shared data layer; and obtaining the second data from the database through the shared data layer when the second data is stored in the database.

20. The system as claimed in claim 17, wherein before obtaining the data, the receiving device further performs the following steps:

transmitting a query request message to the encryption and decryption application; and receiving a query reply message from the encryption and decryption application, wherein the query reply message indicates that a provider providing the data is the transmitting device.

21. The system as claimed in claim 17, wherein the second key is a one-time key and generated by a Time-based One-time Password (TOTP) algorithm.

\* \* \* \* \*